United States Patent
Kassou et al.

(10) Patent No.: US 7,827,316 B2
(45) Date of Patent: Nov. 2, 2010

(54) AUTOMATION NETWORK, ACCESS SERVICE PROXY FOR AN AUTOMATION NETWORK AND METHOD FOR TRANSMITTING OPERATING DATA BETWEEN A PROGRAMMABLE CONTROLLER AND A REMOTE COMPUTER

(75) Inventors: Ahmad-Ramez Madjed Kassou, St. Petersburg (RU); Georgy Martsinovsky, St. Petersburg (RU); Igor Misyuchenko, St. Petersburg (RU)

(73) Assignee: Siemens Aktiengesellschaft, Munich (DE)

( * ) Notice: Subject to any disclaimer, the term of this patent is extended or adjusted under 35 U.S.C. 154(b) by 141 days.

(21) Appl. No.: 12/087,042

(22) PCT Filed: Dec. 27, 2005

(86) PCT No.: PCT/RU2005/000673

§ 371 (c)(1),
(2), (4) Date: Dec. 15, 2008

(87) PCT Pub. No.: WO2007/075099

PCT Pub. Date: Jul. 5, 2007

(65) Prior Publication Data

US 2009/0182440 A1 Jul. 16, 2009

(51) Int. Cl.
*G06F 15/16* (2006.01)
*G06F 12/00* (2006.01)
(52) U.S. Cl. ...................... 709/248; 709/250
(58) Field of Classification Search .......... 709/248, 709/250, 203, 217–219, 225–229
See application file for complete search history.

(56) References Cited

U.S. PATENT DOCUMENTS

| 6,151,625 A | 11/2000 | Swales et al. |
| 6,282,454 B1 | 8/2001 | Papadopoulos et al. |

(Continued)

FOREIGN PATENT DOCUMENTS

| DE | 10207831 | 9/2003 |
| EP | 1256861 A1 | 11/2002 |
| WO | WO 0223290 A2 | 3/2002 |
| WO | WO 0231608 A2 | 4/2002 |

*Primary Examiner*—Zarni Maung

(57) ABSTRACT

There is described an automation network, an access service proxy for an automation network and a method for transmitting operating data between a programmable controller and a remote computer, wherein the operating data of the programmable controller can be transmitted via the Internet or an intranet by means of the HTTP protocol and displayed and/or modified on the remote computer by an Internet browser. The access service proxy here contains a server for supplying the web pages containing the operating data of the programmable controller to the Internet browser of the remote computer, an interface, to which an engineering system can be connected so that operating data of the programmable controller can be transmitted using a communication mechanism for automation-engineering field communication via the connection between access service proxy and engineering system, and a synchronization unit for updating the content of the web pages if the operating data is modified by the engineering system. This provides uniform access to the operating data of the programmable controller and consequently data consistency and security against unauthorized access.

17 Claims, 2 Drawing Sheets

U.S. PATENT DOCUMENTS

| | | |
|---|---|---|
| 6,484,061 B2 | 11/2002 | Papadopoulos et al. |
| 7,441,019 B2 * | 10/2008 | Zintel et al. .................. 709/220 |
| 7,546,602 B2 * | 6/2009 | Hejlsberg et al. ........... 719/313 |
| 7,558,846 B2 * | 7/2009 | Gu et al. ..................... 709/220 |
| 2002/0091784 A1 | 7/2002 | Baker et al. |
| 2003/0217096 A1 * | 11/2003 | McKelvie et al. ........... 709/202 |
| 2009/0287837 A1 * | 11/2009 | Felsher ....................... 709/229 |

* cited by examiner

AUTOMATION NETWORK, ACCESS SERVICE PROXY FOR AN AUTOMATION NETWORK AND METHOD FOR TRANSMITTING OPERATING DATA BETWEEN A PROGRAMMABLE CONTROLLER AND A REMOTE COMPUTER

CROSS REFERENCE TO RELATED APPLICATIONS

This application is the US National Stage of International Application No. PCT/RU2005/000673, filed Dec. 27, 2005 and claims the benefit thereof. The International Application is incorporated by reference herein in its entirety.

FIELD OF INVENTION

The invention relates to an automation network comprising at least one programmable controller and comprising at least one remote computer, to an access service proxy for an automation network, and to a method for transmitting operating data between a programmable controller and a remote computer.

BACKGROUND OF INVENTION

The term programmable controller is understood to refer to a device which executes a control program for influencing a process to be controlled. Devices of this type are frequently called SPCs (stored-program controllers), PLCs (programmable logic controllers, or controllers for short), soft SPCs or soft PLCs. A programmable controller can have a modular structure and contain a programmable central processing unit and intelligent modules which undertake individual automation functions, for example weighing, axis control, closed-loop control, etc. In order to connect to a communication network, which serves to exchange data with other components of an automation network, for example network components or field devices or other programmable controllers, an additional module, which is called a communication processor, can be provided.

From DE 102 07 831 A1 an engineering system for planning and/or configuring a project is known, which engineering system is processed by an automation device for controlling a technical installation. Here, an automation network comprises said engineering system, an operating and monitoring system and an automation device to be planned and configured. The engineering system is provided for planning and/or configuring the automation device. The automation device, which is connected via a bus system to the engineering system and to the operating and monitoring system, comprises different programmable controllers as well as actuators and sensors and other automation components required for controlling a technical installation. The programmable controllers, which are connected to one another via said bus system and/or other suitable bus systems, can be fashioned in different ways. Thus, programmable controllers are provided for solving small, intermediate and large automation tasks within the automation device, whereby microprogrammable controllers can be used for solving small automation tasks, programmable mini-controllers for intermediate automation tasks and powerful programmable controllers for solving more complex automation tasks. The question of which hardware and software components, that is, which programmable controllers, operating and monitoring devices, bus systems, actuators and sensors, and of which control programs the automation device is to be equipped with depends on the complexity of the technical installation to be controlled and on the control task, whereby the required hardware and software components of the automation device can be planned and/or configured by the engineering system. The engineering system is also provided for planning communication networks of the automation network, for planning continuous and sequential process flows, as well as for designing operating and monitoring strategies and for creating recipes for batches and/or batch processes. The project data required for planning and/or configuring a project which will be processed by the automation device to be designed are stored in a memory of a programming unit, for example. To plan and/or configure a programmable controller, for example, the data concerned is transferred from the programming unit to the programmable controller via a data connection, usually with communication mechanisms from the automation environment. Examples of such communication mechanisms based on Ethernet are PROFINET, Ethernet IP or Modbus TCP. A communication mechanism is defined by the relevant protocol, which is usually standardized, and the underlying communication relation. Communication relations organize communication between the devices participating in data transfer in the network, which are also referred to as subscribers. Examples of communication relations are client/server, master/slave, master/master, producer/consumer or publisher/subscriber. TCP/IP is frequently used as the communication protocol in Ethernet-based networks.

From U.S. Pat. No. 6,151,625 A a programmable controller is known which has a web interface for communication via the Internet or intranet. By this means, a client/server system was created which offers operators a user interface which is as user-friendly as general access services in the Web. The Web is a network of documents, which are also called pages and which are stored in a distributed manner on server computers all over the world. Normally, a page contains text, various multimedia offerings, such as for example graphics, video or audio data, and hypertext links to other documents. A browser enables the user to read the pages and to select interactively from the options offered on the page. The browser is a graphics program that sends requests over the Internet to a page and displays the information available on a requested page. The web interface integrated into the programmable controller enables a user to request and display the operating data of the programmable controller using a browser. The operating data may be controller configuration data, process data such as input and output values, register states, statistical data, diagnostic data or configuration data of the input/output interfaces. A remote computer with Internet access via a browser, for example Netscape Communication's Navigator or Microsoft's Internet Explorer, is thus all that is needed in order to operate and monitor the automation device via a human machine interface (HMI).

SUMMARY OF INVENTION

If a programmable controller has both an Internet connection to a remote computer and a proprietary data connection to an engineering system, then it can happen that operating data of the programmable controller is changed by the engineering system without these changes being incorporated in the Web pages which are used for interacting with (for example operating and monitoring) a remote computer.

An object of the invention is therefore to create an automation network, an access service proxy for such an automation network and a method for transmitting operating data between a programmable controller and a remote computer, by means of which inconsistency between data in the web pages used for interaction and the operating data actually present in the programmable controller is avoided.

In order to achieve this object, the automation network of the type stated in the introduction is equipped with the features specified in the characterizing clause of an independent claim. A corresponding access service proxy for a programmable controller and a method for transmitting operating data between a programmable controller and a remote computer are described in further independent claims. Advantageous developments of the invention are specified in the dependent claims.

Connected upstream of one or more programmable controllers is thus an access service proxy in which an interface for the modification of operating data by an engineering system is combined with a web-server-type interface for Internet communication on which the operating data is made available in web pages for an Internet browser of the remote computer, which can access the web server as a web client. If the operating data is modified by the engineering system, the content of the web pages is updated by a synchronization unit of the access service proxy. Consistency in the operating data is thus achieved by the access service proxy as a standard interface between automation device and outside world, and this is done irrespective of whether the operating data is modified through access from the engineering system or from the remote computer via the Internet by means of Hypertext Transfer Protocol (HTTP). Any changes in the operating data of the programmable controller which affect, for example, the project or the control program and which require corresponding changes in the interface to the remote computer have namely to be communicated to the programmable controller via the access service proxy. The access service proxy monitors the protocols which are used for modifying the operating data and detects change events. If such an event is detected, the access service proxy applies a predetermined procedure in order to ensure that the interface to the remote computer is updated in accordance with the modifications made to the operating data.

The access service proxy can also establish a connection to dedicated devices, for example operating and monitoring devices, management and diagnostic tools, to other networks or directly to computers which are used for operating the programmable controller remotely.

The access service proxy can be fashioned as a device which is assigned to one or more programmable controllers and separate from said programmable controller(s). In this case, it is advantageous to provide between the programmable controller(s) and the access service proxy a connection for data transmission comprising the same communication mechanisms for automation-engineering field communication as are used for the data connection between access service proxy and engineering system. This has the advantage that the access service proxy can be transparent for the protocol used in these communication mechanisms and can therefore be implemented with particular ease.

The connection for data transmission between programmable controller and access service proxy can advantageously be fashioned as a network for automation-engineering field communication, and multiple programmable controllers can be connected to this network. This has the advantage that a single access service proxy can be used for multiple programmable controllers.

The access service proxy can thus be used in a wide range of different network architectures and enables equally a data connection to a programmable controller in the simplest architecture as well as operation in a network comprising multiple connected programmable controllers.

As an alternative to this, it is of course also possible to integrate the access service proxy as a component into a programmable controller.

Advantageously, the synchronization unit can contain a software tool which makes it possible for web pages of the access service proxy to be modified by an engineering system. In this way, when changes are made to the operating data by the engineering system, it is also possible selectively to adapt in an appropriate manner the web pages of the web server located in the access service proxy to these changes.

Furthermore, the access service proxy can advantageously be equipped with a security unit, by means of which the identification and authorization of devices wishing to access operating data of programmable controllers located downstream of the access service proxy is carried out. The security checks consequently take place at a point upstream of the programmable controllers, and the programmable controllers lying downstream of this point are better protected against attacks. The operating programs of the access service proxy are much less complex than those of the programmable controllers and are therefore better protected against attacks. Different solutions can be applied for identifying and authorizing users. It is readily possible to integrate further security devices into the access service proxy.

BRIEF DESCRIPTION OF THE DRAWINGS

The invention and embodiments and advantages thereof are described in detail below with reference to the drawings in which exemplary embodiments of the invention are shown.

DETAILED DESCRIPTION OF INVENTION

Figure 1:
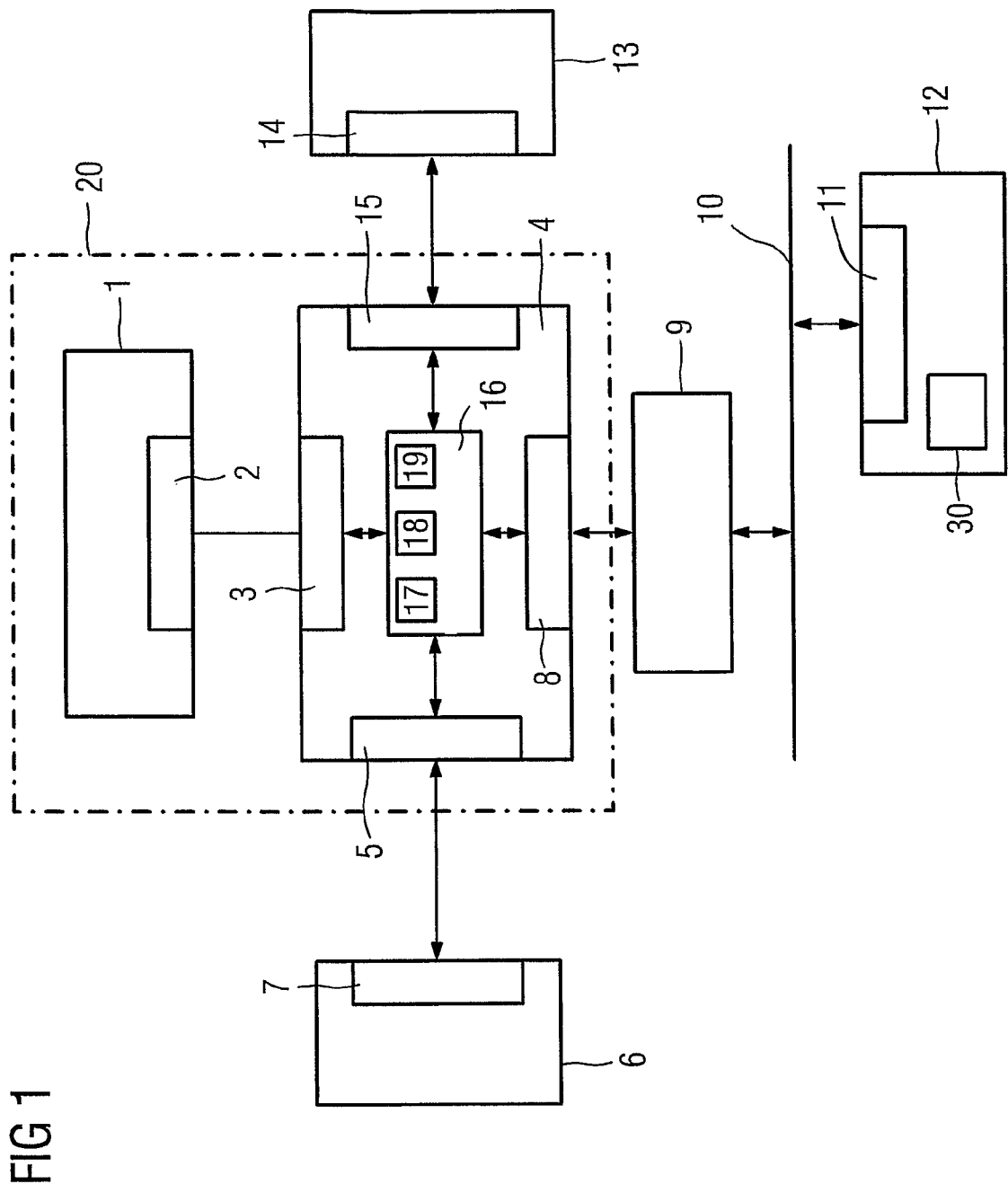
FIG. 1 shows an automation network comprising an access service proxy.

A programmable controller 1 has in accordance with FIG. 1 an interface 2 which is connected to a corresponding interface 3 of an access service proxy 4 for the transmission of data by means of a communication mechanism for automation-engineering field communication. Connected to a further interface 5 of the access service proxy 4 is an engineering system 6 comprising an interface 7 which uses the same communication mechanism for data transmission. Data which has to be transmitted from the engineering system 6 to the programmable controller 1 or vice versa is forwarded by the access service proxy 4 without protocol conversion. A web server 8 of the access service proxy 4 is connected via an optional switch 9 or router with firewall to the Internet 10 or an intranet. Also located in this Internet 10 is a client 11 which is implemented in a remote computer 12. Web pages can be displayed and/or modified on the remote computer 12 by means of an Internet browser 30. In order to connect an operating and monitoring device 13 directly to the access service proxy 4, these are equipped with a further client 14 and a further web server 15. The access service proxy 4 has a kernel 16 which contains a security unit 17, a synchronization unit 18 and an operating-data map 19. As indicated by broken lines 20 in FIG. 1, the access service proxy 4 can, as an alternative to the embodiment shown, be integrated into a programmable controller.

The access service proxy 4 represents a uniform access point to the operating data of the programmable controller 1, which access point is responsible for all communication with remote locations. The programmable controller 1 consequently cannot be reached directly via the Internet, and access to the data of the programmable controller 1 has first to be enabled by the access service proxy 4 connected upstream, which carries out identification and authorization through the security unit 17. Consequently, an attacker can no longer attack the programmable controller 1 directly, but only the access service proxy 4. The web server 8 enables access to the operating data of the programmable controller 1 via the Internet 10. The kernel 16 of the access service proxy 4 translates the TCP/IP, FTP and HTTP protocols used in the Internet into the protocol of the communication mechanism, e.g. of the PROFINET, which is used for communication between the programmable controller 1 and the access service proxy 4 in automation-engineering field communication. In each transmission of data between engineering system 6 and programmable controller 1 and between remote computer 12 and programmable controller 1 the synchronization unit 18 in the kernel 16 of the access service proxy 4 monitors whether operating data is modified by the data transmission. If such a change event occurs, then the synchronization unit 18 ensures the necessary data consistency. In the case of the transmission of data between engineering system 6 and programmable controller 1, this can for example be achieved by the synchronization unit 18 drawing the attention of a user of the engineering system 6 to the fact that the content of the pages stored in the web server 8 and possibly also in the web server 15 has to be harmonized with the changes made to the operating data of the programmable controller 1. The information to the user can for example be given the form of a warning or an active request that prompts the user to carry out the necessary update according to the procedure specified in each case. Alternatively, an automatic update can also be carried out by the synchronization unit 18. In a corresponding implementation of the web servers 8 and 15, the adaptation of the operating data can be made in the operating-data map 19. In the event of a request by the remote computer 12 to access the programmable controller 1, in which no change is made to the operating data, a protocol conversion can be waived and the operating-data map 19 accessed through the web server 8 without any further communication between access service proxy 4 and programmable controller 1 being required. If, however, the operating data of the programmable controller 1 is modified by the remote computer 12, a protocol conversion has to be carried out, and the access service proxy 4 forwards the operating-data request to the programmable controller 1. The request is responded to in the required manner by the programmable controller 1 and the operating-data map 19 adapted accordingly. To do this, an OPC-XML server (OPC: OLE for process control, OLE: object linking and embedding, XML: extensible markup language), for example, can be used on the page of the programmable controller 1 in the interface 2, and an OPC-XML client used in the interface 3 of the access service proxy 4. In this way, further web pages can be stored in the programmable controller 1. To simplify the detection of changes to the operating data of the programmable controller 1, version numbers can be introduced for projects.

The identification and authorization of users is carried out by the security unit 17 prior to their accessing the operating data of the programmable controller 1, so as to prevent unauthorized access and thus to increase the operating security of the automation device. Through the access service proxy 4 it is also possible to resolve conflicts in accessing the programmable controller 1 and to record and log all access events to the programmable controller 1.

Figure 2:
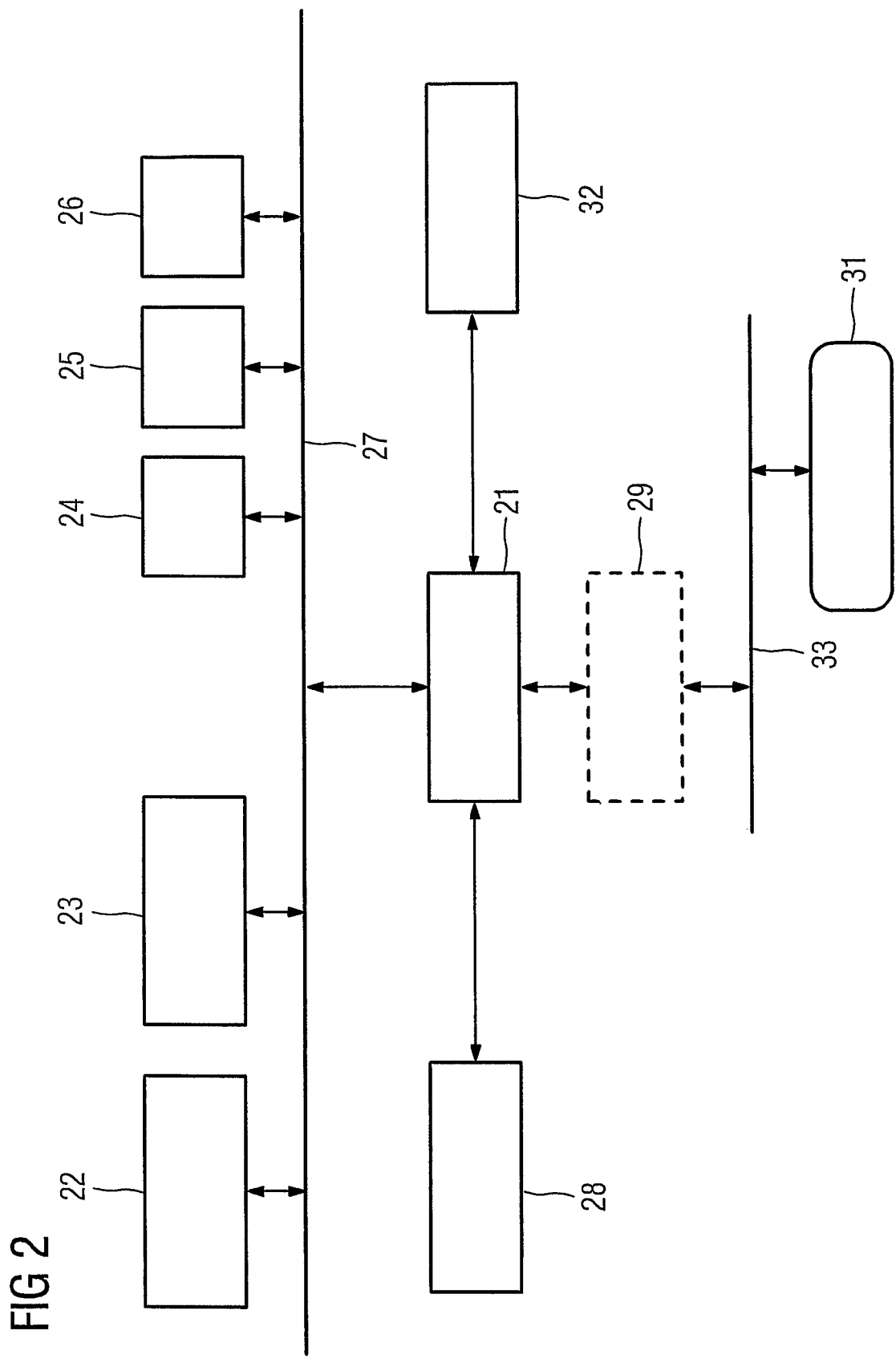
FIG. 2 shows an automation network comprising multiple programmable controllers and input/output devices.

FIG. 2 shows an exemplary embodiment of an automation network in which an access service proxy 21 is connected upstream of an automation device which consists of two programmable controllers 22 and 23 and three distributed input/output devices 24, and 26. The devices 22 . . . 26 of the automation device are connected to one another and to the access service proxy 21 via a communication network 27, in which a communication mechanism for automation-engineering field communication is used for data transmission. It is particularly clear from this exemplary embodiment that not only the operating data of a single programmable controller but the operating data of an entire automation device can be kept consistent and protected against access by unauthorized parties by means of an upstream access service proxy 21. As in the diagram shown in FIG. 1, connected to the access service proxy 21 are an engineering system 28, a remote computer 31 (via an optional switch 29 and the Internet 33) and an operating and monitoring device 32 (directly).

The invention claimed is:

1. An automation network, comprising:
at least one programmable controller;
at least one remote computer, wherein operating data of the programmable controller are transmitted via an Internet or an intranet based upon a Hypertext Transfer Protocol and displayed and/or modified on the remote computer by an Internet browser;
an access service proxy, the access service proxy has a server for supplying the web pages containing the operating data of the programmable controller to the Internet browser of the remote computer, an interface, to connect an engineering system such that operating data of the programmable controller can be transmitted using a communication mechanism for automation-engineering field communication via the connection between access service proxy and engineering system; and
a synchronization unit for updating the content of the web pages if the operating data is modified by the engineering system.

2. The automation network as claimed in claim 1, further comprising a transmission connection between the programmable controller and the access service proxy for transmitting data with the same communication mechanism for automation-engineering field communication that is provided for transmitting data between the access service proxy and engineering system.

3. The automation network as claimed in claim 2, wherein the connection for data transmission between programmable controller and access service proxy is fashioned as a network for automation-engineering field communication and wherein a plurality of programmable controllers are connected to this network.

4. The automation network as claimed in claim 3, wherein the synchronization unit has a software tool to modify the web pages by the engineering system.

5. The automation network as claimed in claim 4, wherein the access service proxy has a security unit for identifying and authorizing devices accessing the operating data of the programmable controller.

6. The automation network as claimed in claim 3, wherein the access service proxy has a security unit for identifying and authorizing devices accessing the operating data of the programmable controller.

7. The automation network as claimed in claim 2, wherein the synchronization unit has a software tool to modify the web pages by the engineering system.

8. The automation network as claimed in claim 7, wherein the access service proxy has a security unit for identifying and authorizing devices accessing the operating data of the programmable controller.

9. The automation network as claimed in claim 2, wherein the access service proxy has a security unit for identifying and authorizing devices accessing the operating data of the programmable controller.

10. The automation network as claimed in claim 1, wherein the synchronization unit has a software tool to modify the web pages by the engineering system.

11. The automation network as claimed in claim 10, wherein the access service proxy has a security unit for identifying and authorizing devices accessing the operating data of the programmable controller.

12. The automation network as claimed in claim 1, wherein the access service proxy has a security unit for identifying and authorizing devices accessing the operating data of the programmable controller.

13. An access service proxy for an automation network, comprising:
 a connection to the automation network, wherein the network has at least one programmable controller and at least one remote computer, wherein operating data of the programmable controller are transmitted via an Internet or an intranet based upon a Hypertext Transfer Protocol and displayed and/or modified on the remote computer by an Internet browser;
 a server for supplying the web pages containing the operating data of the programmable controller to the Internet browser of the remote computer, with an interface, to which an engineering system can be connected such that operating data of the programmable controller is transmittable using a communication mechanism for automation-engineering field communication via the connection between access service proxy and engineering system; and
 a synchronization unit for updating the content of the web pages if the operating data is modified by the engineering system.

14. A method for transmitting operating data between a programmable controller and a remote computer, comprising:
 transmitting operating data of the programmable controller via the Internet or an intranet based upon a Hypertext Transfer Protocol to the remote computer;
 providing an access service proxy, wherein the access service proxy has a server for supplying the web pages containing the operating data of the programmable controller to an Internet browser of the remote computer, an interface, to which an engineering system is connectable so that operating data of the programmable controller is transmittable using a communication mechanism for automation-engineering field communication via the connection between access service proxy and the engineering system; and
 providing a synchronization unit for updating the contents of the web pages if the operating data is modified by the engineering system.

15. The method as claimed in claim 14, wherein the transmitted operating data of the programmable controller is displayed on the remote computer by an Internet browser.

16. The method as claimed in claim 15, wherein the transmitted operating data of the programmable controller is modified on the remote computer by an Internet browser.

17. The method as claimed in claim 14, wherein the transmitted operating data of the programmable controller is modified on the remote computer by an Internet browser.

* * * * *